R. W. ANDREWS.
WATER FLOW DEVICE.
APPLICATION FILED JUNE 28, 1917.

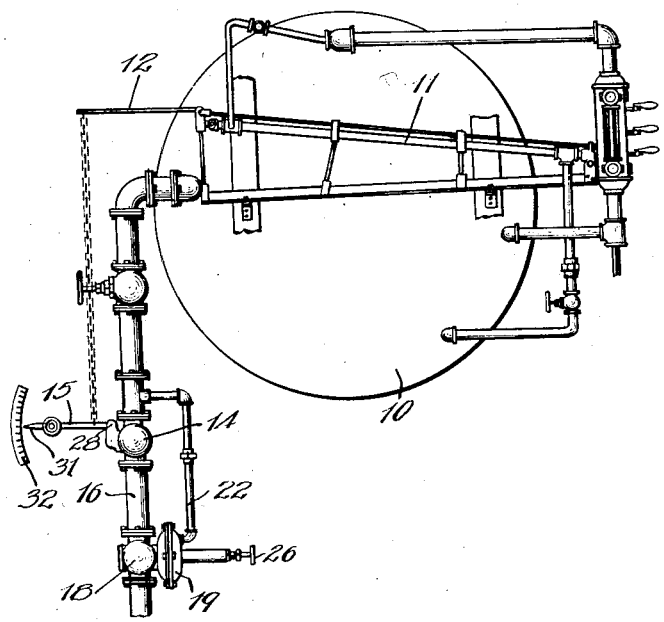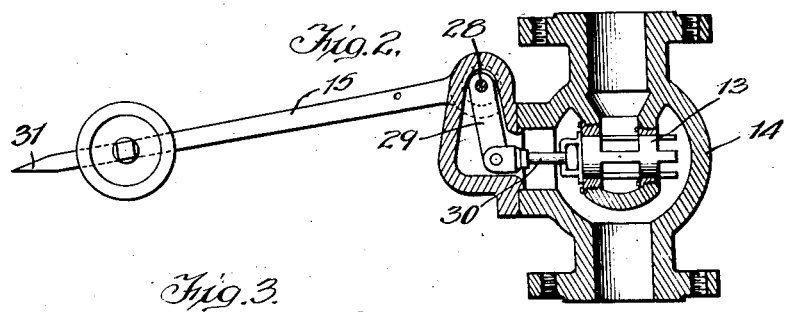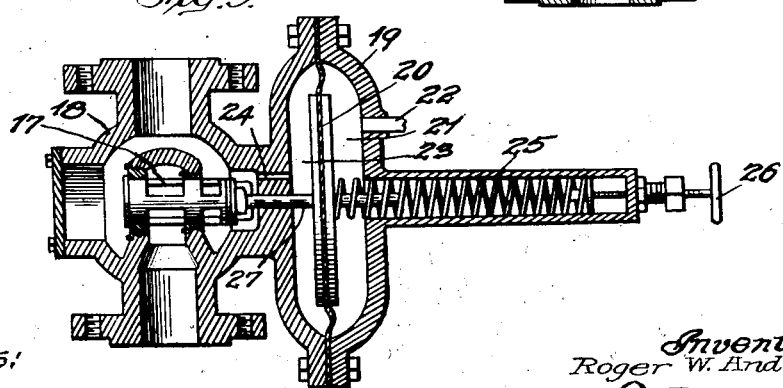

1,396,239.

Patented Nov. 8, 1921.
2 SHEETS—SHEET 2.

WITNESS
Leonard W. Novander.

INVENTOR.
Roger W. Andrews
BY E. J. Andrews
ATTORNEY

UNITED STATES PATENT OFFICE.

ROGER W. ANDREWS, OF ERIE, PENNSYLVANIA, ASSIGNOR TO NORTHERN EQUIPMENT COMPANY, OF ERIE, PENNSYLVANIA, A CORPORATION OF PENNSYLVANIA.

WATER-FLOW DEVICE.

1,396,239.    Specification of Letters Patent.    Patented Nov. 8, 1921.

Application filed June 28, 1917. Serial No. 177,460.

*To all whom it may concern:*

Be it known that I, ROGER W. ANDREWS, a citizen of the United States, residing at Erie, in the county of Erie and State of Pennsylvania, have invented certain new and useful Improvements in Water-Flow Devices, of which the following is a specification.

This invention relates to the flow of fluids through orifices and particularly to the flow of water through valves.

It has for an object the production of means for maintaining a constant fall in pressure of the fluid through the orifice; that is, maintaining a pressure on the inlet side of the orifice which is always greater by a constant amount than the back pressure of the fluid on the outlet side of the orifice. The purpose of this is to insure the same rate of flow of water through the orifice for any given opening of the orifice. When the pressure drop through the orifice is always uniform the rate of flow for a given position of the valve, and hence for a given water-level elevation in the boiler, will always be the same. It has for a further object the production of means for determining or indicating at all times the amount of flow of the fluid through the orifice.

In order to more clearly describe my invention I have illustrated and described herein the application of the invention to the feed-water valve of a steam boiler; but it is to be understood that the invention is applicable in general to the flow of any liquids or gases through valves or any orifices.

Figure 4:
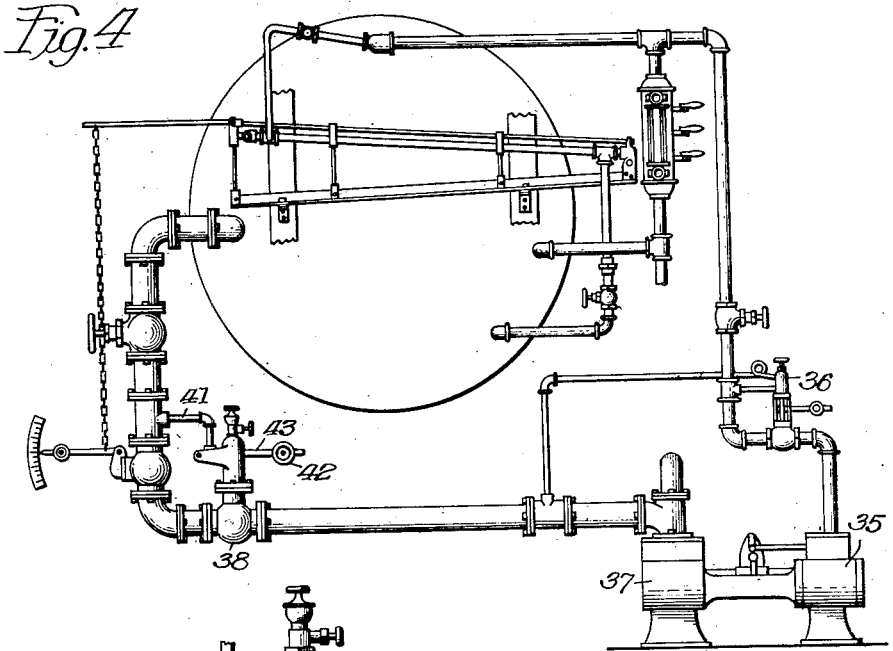
Figure 5:
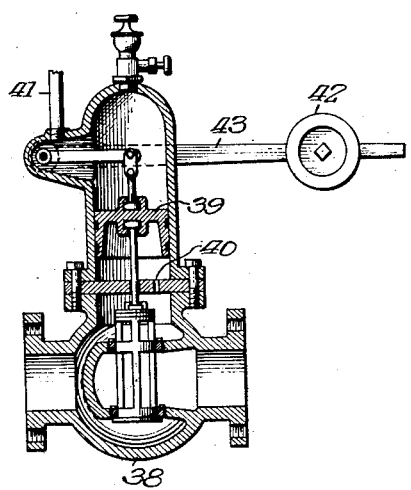

In the accompanying drawings Figure 1 is an elevation somewhat diagrammatic, of a boiler, with a feed-water regulating system attached thereto which embody the features of my invention. Fig. 2 is an enlarged, central, longitudinal section of the feed-water valve of the boiler. Fig. 3 is an enlarged, central section of a valve and controlling means therefor which embody, in detail, features of my invention. Fig. 4 is a complete feed-water regulating system connected with the boiler; and Fig. 5 is a sectional view of a modified form of valve controlling means.

It is customary in feeding water to boilers to provide a regulator for controlling the feed-water valve. In this instance, for this purpose, I have shown, attached to the boiler 10, a common form of regulator comprising an expansion tube 11, which, as the water in the boiler rises or sinks, operates a lever 12, which, in turn operates the plunger 13 of a feed-water valve 14, by means of a weighted lever 15. Water under pressure is supplied to the feed-water pipe in any suitable manner. One manner of controlling the pressure of the water thus supplied will be described hereinafter.

By my invention, however, a substantially constant fall in pressure through the feed-water valve is at all times maintained, irrespective of the manner of supplying the water under pressure to the feed-water pipe. In the feed-water pipe 16, between the valve 14 and the source of water supply, I insert a pressure control valve. This valve may be of any suitable type. I prefer for the purpose a balanced valve 17 in the casing 18. Evidently, as the water flows through the feed pipe, the fall in pressure through the valve 14 will be affected by the opening of the control valve 17; as the control valve opening increases the pressure on the inlet side of the valve 14 will increase; and as the control valve opening decreases the inlet pressure of valve 14 will decrease. In order to properly control the opening of the control valve 17, any suitable means may be used. I prefer for the purpose the following: Fixed to the casing 18, is a diaphragm casing 19, inclosing a diaphragm 20. The chamber 21 formed by the diaphragm and its casing is connected, by means of a pipe 22, with the feed water-pipe 16, between the valve 14 and the boiler; while the chamber 23, on the other side of the diaphragm, is connected to the feed pipe on the other side of the valve 14 by means of a vent 24, and the valve casing 18. As a consequence the position of the diaphragm is affected by the pressures of the water on opposite sides of the valve 14.

A spring 25, adjustable by means of the hand wheel 26, assists the water pressure in chamber 21 in balancing the pressure in chamber 23; and the constant excess pressure that is desired to be maintained on the inlet side of the valve 14, is determined by the amount of pressure exerted on the diaphragm by the spring 25. The stem 27 of the valve 17 is connected to, and hence controlled by, the diaphragm. By these means the opening of the valve 17 will depend upon the position of the diaphragm, and this, in turn, depends upon the relative water pressures in the chambers 21 and 23.

In operation, if, for any reason, the excess pressure in the feed pipe, below the valve 14, increases above the predetermined amount the diaphragm will be forced more or less outwardly, the opening of the valve 17 will be decreased, and the excess pressure will be decreased accordingly; and the reverse process will be carried out if the excess pressure decreases.

It is often desired to determined the flow of a fluid through an orifice, and if the fall in pressure through the orifice and the cross-section of the orifice are known, the flow is easily determined. Evidently, if the fall in pressure is maintained constant the flow may be determined at any time if the cross section is known. As a part of my invention, therefore, I provide means for determining the amount of flow through the valve, the fall in pressure of which is maintained constant. Any suitable means may be employed for indicating the position of the valve plunger 13, or the amount of the opening thereof. I prefer the following: The weighted lever 15 is connected, by means of the pin 28 and the arm 29 to the valve stem 30 of the plunger; so that the position of the plunger depends upon the position of the lever 15. The outer end 31 of the lever may therefore be used as an index to the plunger position; and adjacent this index I fix a scale 32 which may be calibrated to indicate the position of the plunger or the magnitude of the orifice as may be desired. In order to give the most accurate results, the actual flow through the valve, for any given fall in pressure, and for various positions of the plunger, may be determined by any suitable means; and the scale 32 may be calibrated, if desired, according to these determinations.

In the application of my invention it will appear that the respective connections between each diaphragm chamber and its corresponding feed valve chamber, should be as short as possible in order to maintain the pressures in the corresponding chamber as nearly equal as possible; but that the exact relative position of the diaphragm and the valve is not very material, as any variation in elevation of one or the other will effect similarly the pressures on the opposite sides of the diaphragm.

When very accurate measurements or sensitive feeding of water to the boiler, is desired, I use, in connection with means for controlling the pressure drop through the feed-water valve, means for supplying water to the feed-water pipe at a pressure exceeding, by a fairly constant amount, the pressure in the boiler. This reduces materially the work of the control valve 17, and produces more accurate results. Any suitable means may be used to produce this constant excess pressure. I prefer for the purpose a steam pump 35, controlled by an ordinary form of constant excess-pressure governor 36, and operating a feed-water pump 37. Control valve 17 or any suitable form of control valve may be used in the complete system. I prefer for the purpose a valve 38, operated by a piston 39, which receives the pressure of the water from the inlet side of the feed-water valve on the lower side of the piston, through an orifice 40; and the pressure from the outlet side of the valve on the upper side of the piston through a pipe 41; a weight 42, acting through the arm 43, assisting the pressure on the upper side of the piston.

In operation the valve 38 acts as a regulator of the pressure drop through the feed-water valve 17. If the steam pressure or the water in the boiler rises, the pressure on the outlet side of the valve 14 will rise, but this increased pressure, acting through pipe 41, will force the piston 39 down, opening the valve 38 somewhat and increasing the pressure on the inlet side of the valve 14. Or if the pump pressure becomes too great the reverse process follows.

By these means a very constant pressure drop through valve 14 will be maintained. By varying the magnitude or the position of the weight 42 the amount of pressure drop through valve 14 may be varied. And, inasmuch as the cross section of the orifice of the valve 14 will be proportional to the distance the plunger moves from its closed position, by maintaining constant, at a known value, the pressure drop through the orifice, the flow of water therethrough may be indicated by the scale 32 and the apparatus forms an accurate water-flow meter.

I claim as my invention:

1. A fluid conduit, an orifice in said conduit, means for maintaining constant the fluid pressure on one side of said orifice in excess of the fluid pressure on the other side of said orifice, and means depending on said excess pressure for varying the magnitude of said orifice.

2. A fluid conduit, an orifice in said conduit, means for maintaining constant the fluid pressure on one side of said orifice in excess of the fluid pressure on the other side of said orifice, means depending on said excess pressure for varying the magnitude of said orifice, and means for indicating the magnitude of said orifice.

3. A fluid conduit, an orifice in said conduit, means for maintaining constant the fluid pressure on one side of said orifice in excess of the fluid pressure on the other side of said orifice, means depending on said excess pressure for varying the magnitude of said orifice, means for indicating the magnitude of said orifice, and means for varying the pressure on one side of said orifice.

4. In a boiler feed-water system, a feed-water pipe, a valve in said pipe, means for varying the position of said valve depending upon the elevation of the water level in said boiler, and means for maintaining a constant excess pressure of water on one side of said valve in reference to the pressure on the other side of said valve.

5. In a boiler feed-water system, a feed-water pipe, a valve in said pipe, means for varying the position of said valve depending upon the elevation of the water level in said boiler, means for maintaining a constant excess pressure of water on one side of said valve in reference to the pressure on the other side of said valve, and means for indicating the magnitude of said valve opening.

6. In a boiler feed-water system, a feed-water pipe, a feed-water valve in said pipe, a feed-water regulator for varying the opening of said valve, means for maintaining constant the fall of water pressure through said valve, and means for indicating the magnitude of the orifice of said valve.

7. The combination of a boiler feed-water valve, a feed-water pump delivering water to said valve, a constant excess-pressure governor controlling the water pressure delivered by said pump, and means for maintaining constant the pressure drop through said valve.

8. The combination of a boiler, a valve for feeding water to said boiler, means for delivering water to said valve, means for maintaining a pressure on said water exceeding by a substantially constant amount the pressure in said boiler, and means for maintaining constant the pressure drop through said valve.

9. The combination of a boiler, a valve for feeding water to said boiler, means for delivering water to said valve, means for maintaining a pressure on said water exceeding by a substantially constant amount the pressure in said boiler, means for maintaining constant the pressure drop through said valve, and means for indicating the magnitude of the opening through said valve.

10. The combination of a fluid conduit, an orifice in said conduit, means affected by the flow of fluid through said orifice for varying the magnitude of said orifice, means tending to maintain substantially constant the fluid pressure on one side of said orifice in excess of the pressure on the other side, and additional means for increasing the constancy of said excess pressure, whereby the flow of fluid through said orifice will be substantially proportioned to the magnitude of said orifice.

11. The combination of a fluid conduit, an orifice in said conduit, means tending to maintain substantially constant the fluid pressure on one side of said orifice in excess of the pressure on the other side, additional means for increasing the constancy of said excess pressure, and means affected by the flow of fluid through said orifice for varying the magnitude of said orifice, and means for indicating said magnitude, whereby the rate of flow through said orifice may be determined.

12. The combination of a conduit, an orifice in said conduit, means tending to maintain substantially constant the fluid pressure on one side of said orifice in excess of the pressure on the other side, additional means for increasing the constancy of said excess pressure, means affected by the flow of fluid through said orifice for varying the magnitude of said orifice, means for indicating said magnitude, and means for varying said excess pressure.

In testimony whereof, I hereunto set my hand.

ROGER W. ANDREWS.